United States Patent
Yim et al.

(10) Patent No.: US 10,328,821 B2
(45) Date of Patent: Jun. 25, 2019

(54) SYSTEM AND METHOD FOR CONTROLLING TORQUE OF ELECTRIC VEHICLE

(71) Applicant: Hyundai Motor Company, Seoul (KR)

(72) Inventors: Sangjin Yim, Seoul (KR); Jea Myoung Youn, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 307 days.

(21) Appl. No.: 15/259,180

(22) Filed: Sep. 8, 2016

(65) Prior Publication Data
US 2017/0291506 A1    Oct. 12, 2017

(30) Foreign Application Priority Data

Apr. 8, 2016  (KR) .......................... 10-2016-0043520

(51) Int. Cl.
  *B60L 15/20*    (2006.01)
(52) U.S. Cl.
  CPC ....... *B60L 15/2063* (2013.01); *B60L 15/2009* (2013.01); *B60L 2240/12* (2013.01); *B60L 2240/423* (2013.01); *B60L 2250/26* (2013.01); *Y02T 10/645* (2013.01); *Y02T 10/7275* (2013.01)
(58) Field of Classification Search
  CPC ............. B60L 15/2063; B60L 15/2072; B60L 2240/14
  See application file for complete search history.

(56) References Cited

U.S. PATENT DOCUMENTS

| | | | |
|---|---|---|---|
| 2010/0076637 A1* | 3/2010 | Ueoka | B60T 7/042 701/22 |
| 2015/0111693 A1* | 4/2015 | Wang | B60K 6/48 477/5 |

FOREIGN PATENT DOCUMENTS

| | | |
|---|---|---|
| KR | 10-2012-0080720 A | 7/2012 |
| KR | 10-2013-0009083 | 1/2013 |
| KR | 10-1221798 B1 | 1/2013 |
| KR | 10-1526814 B1 | 6/2015 |

* cited by examiner

*Primary Examiner* — Anne M Antonucci
*Assistant Examiner* — Renee LaRose
(74) *Attorney, Agent, or Firm* — Mintz Levin Cohn Ferris Glovsky and Popeo, P.C.; Peter F. Corless (57) ABSTRACT

A system and a method for controlling a torque of an electric vehicle are provided. The system includes a driving information detecting unit that detects a speed of the electric vehicle and a position of an accelerator pedal and a controller that applies an offset torque input from a driver to a basic creep torque line set for creep driving of the electric vehicle to set an offset torque line varied from the basic creep torque line in a negative (−) torque direction. Additionally, the controller calculates a basic creep torque depending on the speed of the electric vehicle based on the basic creep torque line when the offset torque is not input and calculates a driver creep torque depending on the speed of the electric vehicle based on the offset torque line when the offset torque is input.

18 Claims, 5 Drawing Sheets

SYSTEM AND METHOD FOR CONTROLLING TORQUE OF ELECTRIC VEHICLE

CROSS-REFERENCE TO RELATED APPLICATION

This application claims priority to and the benefit of Korean Patent Application No. 10-2016-0043520 filed in the Korean Intellectual Property Office on Apr. 8, 2016, the entire contents of which are incorporated herein by reference.

BACKGROUND

(a) Field of the Invention

The present invention relates to a system and a method for controlling a torque of an electric vehicle, and more particularly, to a system and method for controlling torque of an electric vehicle which minimize energy loss by hydraulic braking and provide an acceleration sensation of a driver by applying an offset torque of the driver to a basic creep torque line to increase regenerative braking.

(b) Description of the Related Art

Generally, an electric vehicle (EV), a hybrid electric vehicle (HEY), and a fuel cell vehicle are driven by force of a motor by power of a battery unlike an existing engine driven vehicle. The hybrid electric vehicle is a type of vehicle that obtains driving force by an engine driven using a fuel and a motor driven by power of a battery, and the fuel cell vehicle is a type of vehicle driven by a motor using electricity produced by a fuel cell.

Hereinafter, the electric vehicle, the hybrid electric vehicle, and the fuel cell vehicle will be referred to as an electric vehicle since they drive the motor using electric energy. Generally, in the engine driven vehicle, an idle torque of the engine is transferred to a torque converter and a transmission even when a driver does not engage an accelerator pedal and a brake pedal while driving the vehicle, and thus, creep driving in which the vehicle is accelerated (+torque) up to a predetermined speed at a low speed and is slowly decelerated (−torque) (is operated as a load) at a predetermined speed or more is executed.

The creep driving is a phenomenon naturally occurring without performing a specific control when the engine of the existing engine driven vehicle is being operated. Unlike this, natural creep driving is impossible in the electric vehicle that does not include the engine. Therefore, in the electric vehicle, to generate a driving sensation similar to the creep driving of the existing engine driven vehicle, a creep torque has been output through the motor when the accelerator pedal and the brake pedal are disengaged.

The electric vehicle is operated in a regenerative braking mode in which inertial energy is recovered through power generation of the motor and is charged in the battery when the electric vehicle is driven by inertia without engaging the accelerator pedal and the brake pedal at a predetermined speed or greater. The electric vehicle is decelerated using the regenerative braking and/or hydraulic braking force by frictional force of a hydraulic braking device when the electric vehicle is decelerated by an operation of the brake pedal.

Since total braking force of the electric vehicle is determined as the sum of the hydraulic braking force and the regenerative braking force, there is a disadvantage that an energy recovery amount by the regenerative braking is decreased as the hydraulic braking force by the operation of the brake pedal increases. Particularly, a frequency operation of the brake pedal at the driving the vehicle at a low speed in congestion, delay, and slow-down sections frequently generated in general driving increases the hydraulic braking force to decrease the energy recovery amount. In addition, it offsets acceleration force generated by the creep torque by the hydraulic braking force, which causes energy loss.

The above information disclosed in this section is merely for enhancement of understanding of the background of the invention and therefore it may contain information that does not form the prior art that is already known in this country to a person of ordinary skill in the art.

SUMMARY

The present invention provides a system and a method for controlling a torque of an electric vehicle having advantages of minimizing energy loss by hydraulic braking and providing an acceleration sensation of a driver by applying an offset torque of the driver to a basic creep torque line to increase a regenerative braking amount.

An exemplary embodiment of the present invention provides a system for controlling a torque of an electric vehicle that may include: a driving information detecting unit configured to detect a speed of the electric vehicle and a position of an accelerator pedal; an offset torque setting unit configured to apply an offset torque input from a driver to a basic creep torque line set for the purpose of creep driving of the electric vehicle to set an offset torque line varied from the basic creep torque line in a negative (−) torque direction; and a vehicle controller configured to calculate a basic creep torque depending on the speed of the electric vehicle based on the basic creep torque line when the offset torque is not input and calculate a driver's creep torque depending on the speed of the electric vehicle based on the offset torque line when the offset torque is input.

The driver's creep torque may have a regenerative braking amount increased as compared with the basic creep torque in the same speed condition of the electric vehicle. The offset torque setting unit may be configured to store an offset torque setting allowable range within which the basic creep torque line moves in the negative (−) torque direction to be decreased up to a maximum offset torque line therein. The offset torque line may not be varied in a positive (+) torque direction based on the basic creep torque line, and may be increased or decreased within the offset torque setting allowable range. The offset torque setting unit may be configured to allow the basic creep torque that is a condition in which the speed of the electric vehicle is 0 not to be varied into the offset torque input. The system may further include an input device configured to input and release the offset torque of the driver. The vehicle controller may be configured to calculate a driver's demand torque based on the speed of the electric vehicle and the position of the accelerator pedal and sum the driver's demand torque and the driver's creep torque to determine a final torque of a motor.

Another exemplary embodiment of the present invention provides a method for controlling a torque of an electric vehicle that may include: determining whether an offset torque of a driver is input through an input device; applying the offset torque to a basic creep torque line to set an offset torque line varied from the basic creep torque line in a negative (−) torque direction, when the offset torque is input;

calculating a driver's creep torque depending on a speed of the electric vehicle based on the offset torque line; calculating a driver's demand torque based on the speed of the electric vehicle and a position of an accelerator pedal; and summing the driver's demand torque and the driver's creep torque to determine a final torque of a motor.

The method for controlling a torque of an electric vehicle may further include calculating a basic creep torque depending on the speed of the electric vehicle based on the basic creep torque line when the offset torque is not input. The driver's creep torque may have a regenerative braking amount increased as compared with the basic creep torque in the same speed condition of the electric vehicle. A basic creep torque that is a condition in which the speed of the electric vehicle is 0 may not be varied into the offset torque input. The method may further include resetting the offset torque line within an offset torque setting allowable range when a variation in the offset torque of the driver is generated.

The method for controlling a torque of an electric vehicle may further include calculating a basic creep torque depending on the speed of the electric vehicle based on the basic creep torque line when the offset torque is varied into 0. Additionally, the method may include storing the set offset torque when the electric vehicle is started off and applying the stored offset torque to the basic creep torque line when the electric vehicle is started on next.

As described above, according to an exemplary embodiment of the present invention, the basic creep torque line set in the vehicle manufacturer may be varied into the offset torque input desired by the driver to increase the regenerative braking amount, thereby making it possible to increase the energy recovery amount, and to prevent energy loss due to hydraulic brake braking, thereby making it possible to increase a travel distance.

In addition, the offset torque line of only the driver is set to be appropriate for a traffic condition and a driving pattern, rather than the basic creep torque line, to provide a personalized acceleration sensation to the driver, thereby making it possible to improve a customer satisfaction. Further, the level of the offset torque line may be set by the offset torque input in various low speed sections such as congestion, delay, and slow-down sections of the vehicle to support the one-foot drive, thereby making it possible to decrease fatigue of the driver based on a complex and frequent pedal manipulation.

BRIEF DESCRIPTION OF THE DRAWINGS

The above and other objects, features and other advantages of the present invention will be more clearly understood from the following detailed description when taken in conjunction with the accompanying drawings, in which.

DESCRIPTION OF SYMBOLS

100: system for controlling torque
110: driving information detecting unit
120: offset torque setting unit
130: motor controller
140: vehicle controller

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, exemplary embodiments of the present invention have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification. In addition, the terms "-er", "-or" and "module" described in the specification mean units for processing at least one function and operation and can be implemented by hardware components or software components and combinations thereof.

An electric vehicle used throughout the present specification indicates all the electric vehicles in which an electric motor for driving the vehicle is mounted and regenerative braking is performed, such as a hybrid electric vehicle, a fuel cell vehicle in which fuel cells are mounted, and the like, as well as a pure electric vehicle. Next, a system and a method for controlling a torque of an electric vehicle according to an exemplary embodiment of the present invention will be described in detail with reference to the accompanying drawings.

As described above, in the existing electric vehicle, there was a problem that the energy recovery amount by the regenerative braking is decreased as the hydraulic braking force increased by the operation of the brake pedal. When considering this point reversely, the hydraulic braking force may be decreased when decelerating the electric vehicle by only the regenerative braking or relatively increasing a regenerative braking amount when decelerating the electric vehicle, and thus, an energy recovery amount is increased, such that a driving distance may be increased and electric energy may be saved. Therefore, in a system for controlling a torque of an electric vehicle according to an exemplary embodiment of the present invention, a method capable of preventing energy loss due to hydraulic braking and implementing an acceleration sensation of a driver by varying a basic creep torque line set to default based on an offset torque input of the driver to increase a regenerative braking amount is suggested.

Figure 1:
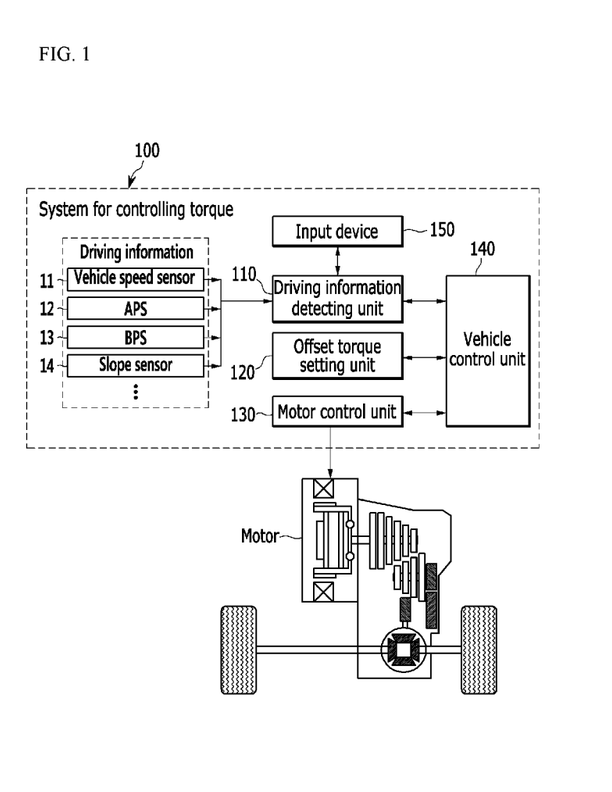
FIG. 1 is a block diagram showing a system for controlling a torque of an electric vehicle according to an exemplary embodiment of the present invention.

FIG. 1 is a block diagram showing a system for controlling a torque of an electric vehicle according to an exemplary embodiment of the present invention. Referring to FIG. 1, the system 100 for controlling a torque of an electric vehicle according to an exemplary embodiment of the present invention may include a driving information detecting unit 110, an offset torque setting unit 120, a motor controller 130, and a vehicle control unit (VCU) 140. The controller 140 may be configured to operate the driving information detecting unit 110, the offset torque setting unit 120, the motor controller 130, and any other components of the system.

The driving information detecting unit 110 (e.g., a sensor) may be configured to detect driving information based on driving of the electric vehicle using at least one of a vehicle speed sensor 11, an accelerator position sensor (APS) 12, a brake pedal sensor (BPS) 13, and a slope sensor 14. The driving information detecting unit 110 may further be configured to detect a speed of the electric vehicle using the vehicle speed sensor 11, and provide a detection result to the vehicle controller 140. The driving information detecting unit 110 may be configured to detect an operation state of an accelerator pedal by a driver using the APS 12, detect a brake operation state using the BPS 13, and provide detection results to the vehicle controller 140. When the accelerator pedal is completely pressed or engaged, a position value of the accelerator pedal is 100%, and when the accelerator pedal is not pressed (e.g., disengaged), a position value of the accelerator pedal is 0%.

The driving information detecting unit 110 may be configured to measure a slope (e.g., a gradient) of a road on which the electric vehicle is being driven using the slope sensor 14, and provide a measurement result to the vehicle controller 140. The offset torque setting unit 120 may be configured to apply an offset torque of the driver input through an input device 150 to a basic creep torque line to set an offset torque line varied from the basic creep torque line in a negative (−) torque direction. The offset torque indicates an offset torque line setting value added to the basic creep torque line set to default to vary the basic creep torque line by the offset torque in a negative (−) torque direction and personalized for the driver.

Figure 2:
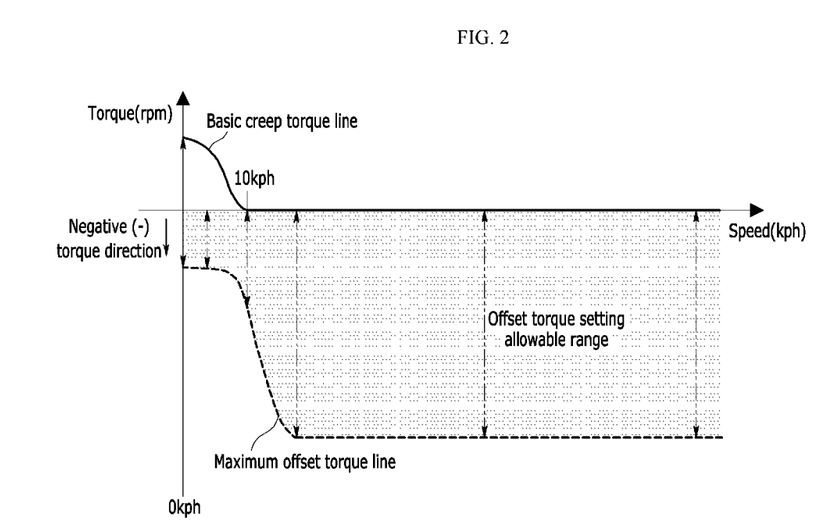
FIGS. 2 and 3 are, respectively, graphs showing offset torque setting allowable ranges according to an exemplary embodiment of the present invention.
Figure 3:
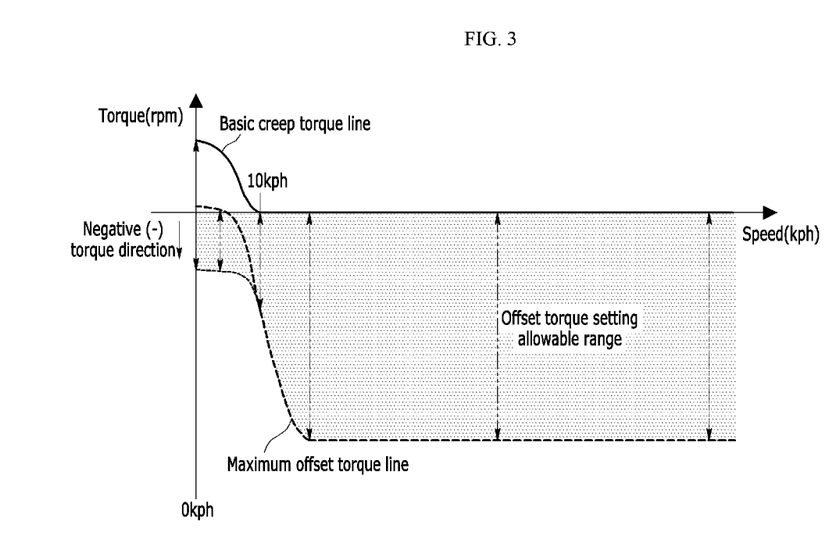

FIGS. 2 and 3 are, respectively, graphs showing offset torque setting allowable ranges according to an exemplary embodiment of the present invention. Referring to FIGS. 2 and 3, in an electric vehicle according to an exemplary embodiment of the present invention, a basic creep torque line may be set to provide the same creep driving sensation as that of an existing engine driven vehicle.

In the basic creep torque line, a basic creep torque (a positive (+) direction torque) at which the electric vehicle naturally moves forward may be generated as in the engine driven vehicle in a low speed section of about 0 to 10 KPH, and 0 torque may be generated in a speed section other than the low speed section, based on a speed of the electric vehicle. An offset torque setting allowable range within which the basic creep torque line may move in the negative (−) torque direction to be decreased up to a maximum offset torque line is stored in the offset torque setting unit 120. The offset torque setting unit 120 may be configured to vary the basic creep torque line within the offset torque setting allowable range based on an offset torque input of the driver.

Since the offset torque basically has a negative (−) value, it may not be varied in a positive (+) torque direction based on the basic creep torque line, and may be increased or decreased (+/−) within the offset torque setting allowable range. However, the offset torque setting unit 120 may be configured to fix a basic creep torque when a speed of the electric vehicle is about 0 KPH as an absolute value to allow the basic creep torque not to be varied into an offset torque input, thereby making it possible to prevent the electric vehicle from being pushed rearward.

The input device 150 may be configured to receive a predetermined level of offset torque of the driver input in at least one of an analog input scheme and a digital input scheme. For example, the input device 150 may be an upper/lower (+/−) input type button, a joystick (+/−), a knob type analog manipulating system, and/or a touch screen of an audio-video-navigation (AVN) installed in a steering wheel or a center fascia region. As an example, the offset torque input of the driver (e.g., offset torque line setting of the driver) may be implemented to utilize a joystick (+/−) and an ON/OFF button used for manipulation of acceleration and deceleration in an existing smart cruise control manipulating system through menu (function) selection. In addition, the offset torque setting unit 120 may be configured to display a set state of a current offset torque and whether the offset torque is released through a cluster and an AVN.

The motor controller 130 may be configured to convert a direct current (DC) voltage supplied from a battery (not shown) into a three-phase alternating current (AC) voltage based on a control signal applied from the vehicle controller 140 to drive a motor. The motor may be operated by the three-phase AC voltage applied from the motor controller 130 to generate a torque, and may be operated as a power generator during deceleration and inertial driving of the electric vehicle to supply regenerative braking energy to the battery.

The vehicle controller 140, which may be an upper level controller configured to execute a general operation of the electric vehicle, may be configured to execute operations of the respective units. For example, for a hybrid electric vehicle, the vehicle controller 140 may correspond to a hybrid control unit (HCU). In particular, the vehicle controller 140 may be configured to receive the driving information detected in the driving information detecting unit 110, and calculate a driver's demand torque based on the speed of the electric vehicle and a position (e.g., engagement degree) of the accelerator pedal. In addition, the vehicle controller 140 may be configured to calculate a basic creep torque depending on a current speed of the electric vehicle based on the basic creep torque line set to the default.

The vehicle controller 140 may be configured to sum the driver's demand torque and the basic creep torque to determine a final torque (hereinafter, referred to as a first final torque), and transfer a torque instruction based on the first final torque to the motor controller 130 to operate the motor. When the offset torque is input, the vehicle controller 140 may be configured to calculate a driver's creep torque depending on the current speed of the electric vehicle based on the offset torque line of the driver, and sum the driver's demand torque and the driver's creep torque to determine a final torque (hereinafter, referred to as a second final torque).

The second final torque has a regenerative braking amount increased based on the offset torque as compared with the first final torque. Accordingly, a regenerative braking amount is increased and the use of a hydraulic brake may be decreased during driving of the electric vehicle, thereby making it possible to maximize an energy recovery amount. For example, in a low speed section in which the vehicle is traveling in a congested area, the offset torque line intended by the driver may be set, thereby making it possible to prevent generation of an unnecessary creep torque and decelerate the vehicle by the increased regenerative braking. In addition, when the electric vehicle is driven on a continuous downhill ramp, the maximum offset torque line may be set to maximize the regenerative braking amount, thereby making it possible to have an effect as if an engine brake is engaged.

Meanwhile, the vehicle controller 140 may be configured to implement a one-foot drive by setting the offset torque line of the driver, and may be configured to adjust a torque of the motor to provide the driver with an acceleration sensation personalized for the driver through the one-foot drive. The one-foot drive indicates a technology in which acceleration and deceleration are performed depending on a step-on level, that is, engagement degree, of an accelerator pedal using the accelerator pedal, and the driver may engage the accelerator pedal at a predetermined depth (e.g., exert a constant amount of pressure onto the pedal) to maintain a predetermined speed.

In the existing engine driven vehicle, inputs of the accelerator pedal and the brake pedal in a stop section are repeated due to the basic creep toque based on the basic creep torque line, which is disadvantageous for fuel consumption and increases a driving fatigue degree. Therefore, the vehicle controller 140 may be configured to set the offset torque line desired by the driver to a predetermined level based on a traffic flow in a congestion section to maintain a desired speed by a depth at which the driver engages the accelerator pedal and perform increased regenerative braking by disengagement of the accelerator pedal.

Therefore, the offset torque line of the driver may be set, thereby making it possible to support the one-foot drive using only the accelerator pedal. Accordingly, effects such as prevention of an unnecessary creep torque, maximization of an energy recovery amount by an increase in regenerative braking, drivability improvement through setting of an acceleration sensation of only the driver, and the like, in the congestion section by only a simple offset torque input of the driver may be expected. Meanwhile, a method for controlling a torque of an electric vehicle according to an exemplary embodiment of the present invention will be described with reference to FIGS. 4 and 5 based on the configuration of the system 100 for controlling a torque of an electric vehicle described above.

Although the system 100 for controlling a torque of an electric vehicle according to an exemplary embodiment of the present invention described above have been subdivided into the respective detailed components for the purpose of the understanding of explanation, these detailed components may be integrated in one system. Therefore, hereinafter, a method for controlling a torque of an electric vehicle according to an exemplary embodiment of the present invention will be described under the assumption that the subject of each step is not a corresponding detailed component, but is the system 100 for controlling a torque of an electric vehicle.

Figure 4:
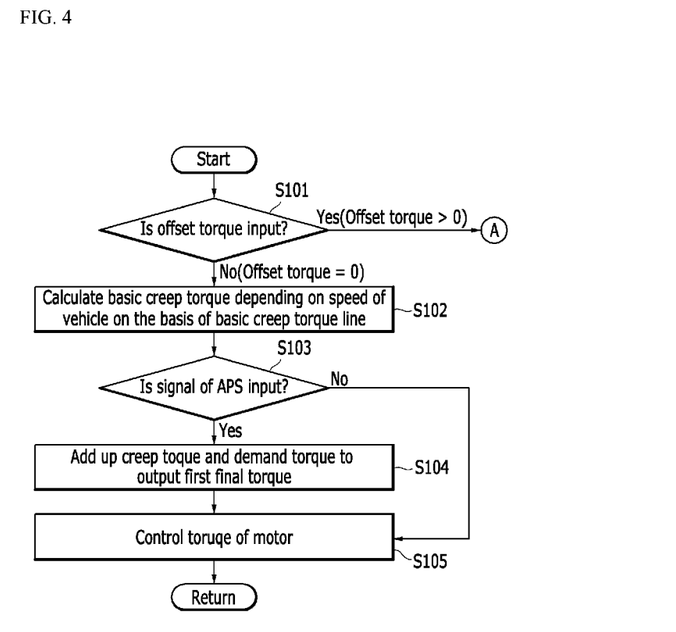
FIG. 4 is a flow chart showing a method for controlling a torque when an offset torque of a driver is not set according to an exemplary embodiment of the present invention.
Figure 5:
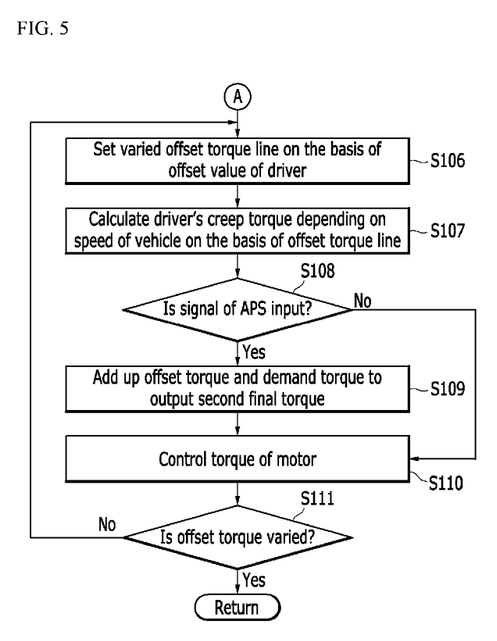
FIG. 5 is a flow chart showing a method for controlling a torque when an offset torque of a driver is set according to an exemplary embodiment of the present invention.

FIG. 4 is a flow chart showing a method for controlling a torque of a motor when an offset torque of a driver is not set according to an exemplary embodiment of the present invention. FIG. 5 is a flow chart showing a method for controlling a torque of a motor when an offset torque of a driver is set according to an exemplary embodiment of the present invention. The method may be executed by the controller. First, referring to FIG. 4, the system 100 for controlling a torque of an electric vehicle according to an exemplary embodiment of the present invention may be configured to determine whether the offset torque of the driver is input (S101), when the electric vehicle is started.

The system 100 for controlling a torque of an electric vehicle may be configured to calculate the basic creep torque depending on the current speed of the electric vehicle based on the basic creep torque line set to the default (S102), when the offset torque of the driver is not input (No of S101). When the offset torque is 0, the system 100 may be configured to determine that the offset torque is not input, and perform a motor control using the basic creep torque line. The system 100 may further be configured to determine whether a signal of the APS 12 is input based on a manipulation of the accelerator pedal by the driver, and adjust the torque of the motor using the basic creep torque (S105) when the signal of the APS 12 is not input (No of S103).

Furthermore, the system 100 may be configured to calculate the driver's demand torque based on the speed of the electric vehicle and the position or engagement degree of the accelerator pedal, and sum the driver's demand torque and the basic creep torque to determine the first final torque (S104), when the signal of the APS 12 is input (Yes of S103). Then, the system 100 may be configured to operate the motor using the first final torque (S105).

Referring to FIG. 5, the system 100 may be configured to sum the offset torque of the driver to the basic creep torque line to set the offset torque line of the driver varied from the basic creep torque line in the negative (−) torque direction (S106), when the offset torque is input from the driver in S101 (Yes of S101). In other words, when the offset torque is an effective value greater than 0, the system 100 may be configured to execute a motor control using the offset torque line of the driver of the corresponding offset level.

The system 100 may be configured to calculate the driver's creep torque depending on the current speed of the electric vehicle based on the basis of the set offset torque line of the driver (S107). In particular, the calculated driver's creep torque has a regenerative braking amount increased as compared with the basic creep torque in the same speed condition of the electric vehicle. The system 100 may be configured to determine whether the signal of the APS 12 is input based on the manipulation of the accelerator pedal by the driver, and adjust the torque of the motor using the driver's creep torque (S105) when the signal of the APS 12 is not input (No of S108).

Additionally, the system 100 may be configured to calculate the driver's demand torque based on the speed of the electric vehicle and the position (e.g., engagement degree) of the accelerator pedal, and sum the driver's demand torque and the driver's creep torque to determine the second final torque (S109), when the signal of the APS 12 is input (Yes of S108). Then, the system 100 may be configured to operate the motor using the second final torque (S110). In particular, the second final torque has a regenerative braking amount increased as compared with the first final torque in the same speed condition of the electric vehicle. The system 100 may return to S107 to continuously perform a torque control based to the preset offset torque line, when a variation in the offset toque based on the input of the driver is not present (No of S111).

The system 100 may return to S101 to continuously perform a motor control based on whether the offset torque is input until the electric vehicle is turned off, when a variation such as an increase or a decrease in the offset torque based on the input of the driver is generated or an offset torque release is input (Yes of S111). In particular, the system 100 may be configured to reset the offset creep torque line based on the varied offset torque when the offset torque is greater than 0 as a variation result, and perform a torque control based on the basic creep torque line when the offset torque is 0 as a variation result.

In the above description, the system 100 may be configured to initialize the offset torque to restore the offset torque to the basic creep torque line (offset torque=0), when the electric vehicle is turned off. In addition, the system 100 may be configured to store the set offset torque when the electric vehicle is tuned off through offset torque environment setting of the driver using the input device 150, and apply the stored offset torque to the basic torque line when the electric vehicle is started again. Therefore, the driver may maintain the offset torque line set to be appropriate for a desired driving sensation, thereby making it possible to prevent a problem of requiring the driver to input the offset torque whenever the electric vehicle is started.

As described above, according to an exemplary embodiment of the present invention, the basic creep torque line set in the electric vehicle may be varied into the offset torque desired by the driver to increase the regenerative braking amount, thereby making it possible to increase the energy recovery amount, and to prevent energy loss due to hydraulic brake braking, thereby making it possible to increase a travel distance.

In addition, the offset torque line of the driver may be set to be appropriate for a traffic condition and a driving pattern, rather than the basic creep torque line set in a vehicle manufacturer, to provide a personalized acceleration sensation to the driver, thereby making it possible to improve a customer satisfaction. Further, the level of the offset torque line may be set in various low speed sections such as congestion, delay, and slow-down sections of the vehicle to enable the one-foot drive, thereby making it possible to decrease fatigue of the driver based on a complex pedal manipulation.

The exemplary embodiments of the present invention described above are not implemented through only the apparatus and/or the method described above, but may also be implemented through programs executing functions corresponding to configurations of the exemplary embodiments of the present invention, a recording medium in which the programs are recorded, and the like. In addition, these implementations may be easily made by those skilled in the art to which the present invention pertains from the exemplary embodiments described above.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A system for controlling a torque of an electric vehicle, comprising:
   a driving information detecting unit configured to detect a speed of the electric vehicle and a position of an accelerator pedal; and
   a vehicle controller configured to:
   apply an offset torque, which is a parameter predetermined by a driver, to a basic creep torque line set for creep driving of the electric vehicle to set an offset torque line varied from the basic creep torque line in a negative (−) torque direction;
   calculate a basic creep torque depending on the speed of the electric vehicle based on the basic creep torque line when the predetermined offset torque is zero; and
   calculate a driver creep torque depending on the speed of the electric vehicle based on the offset torque line when the predetermined offset torque is greater than zero.

2. The system for controlling a torque of an electric vehicle of claim 1, wherein the driver creep torque has a regenerative braking amount increased as compared with the basic creep torque in a same speed condition of the electric vehicle.

3. The system for controlling a torque of an electric vehicle of claim 1, wherein the controller is configured to store an offset torque setting allowable range within which the basic creep torque line moves in the negative (−) torque direction to be decreased up to a maximum offset torque line therein.

4. The system for controlling a torque of an electric vehicle of claim 3, wherein the offset torque line is not varied in a positive (+) torque direction based on the basic creep torque line, and is increased or decreased within the offset torque setting allowable range.

5. The system for controlling a torque of an electric vehicle of claim 1, wherein the controller is configured to prevent the basic creep torque that is a condition in which the speed of the electric vehicle is 0 from being varied into the offset torque input.

6. The system for controlling a torque of an electric vehicle of claim 1, further comprising:
   an input device configured to input and release the offset torque of the driver.

7. The system for controlling a torque of an electric vehicle of claim 1, wherein the vehicle controller is configured to calculate a driver demand torque based on the speed of the electric vehicle and the position of the accelerator pedal and sum the driver demand torque and the driver creep torque to determine a final torque of a motor.

8. The system for controlling a torque of an electric vehicle of claim 1, wherein the driving information detection unit includes a plurality of sensors mounted within the vehicle.

9. A method for controlling a torque of an electric vehicle, comprising:
- applying, by the controller, an offset torque, which is a parameter predetermined by a driver, to a basic creep torque line to set an offset torque line varied from the basic creep torque line in a negative (−) torque direction, when the predetermined offset torque is zero;
- calculating, by the controller, a driver creep torque depending on a speed of the electric vehicle based on the offset torque line when the predetermined offset torque is greater than zero;
- calculating, by the controller, a driver demand torque based on the speed of the electric vehicle and a position of an accelerator pedal; and
- summing, by the controller, the driver demand torque and the driver creep torque to determine a final torque of a motor.

10. The method for controlling a torque of an electric vehicle of claim 9, further comprising:
- calculating, by the controller, a basic creep torque depending on the speed of the electric vehicle based on the basic creep torque line when the offset torque is not input.

11. The method for controlling a torque of an electric vehicle of claim 10, wherein the driver creep torque has a regenerative braking amount increased as compared with the basic creep torque in a same speed condition of the electric vehicle.

12. The method for controlling a torque of an electric vehicle of claim 9, wherein a basic creep torque that is a condition in which the speed of the electric vehicle is 0 is not varied into the offset torque input.

13. The method for controlling a torque of an electric vehicle of claim 9, further comprising:
- resetting, by the controller, the offset torque line within an offset torque setting allowable range when a variation in the offset torque of the driver is generated.

14. The method for controlling a torque of an electric vehicle of claim 9, further comprising:
- calculating, by the controller, a basic creep torque depending on the speed of the electric vehicle based on the basic creep torque line when the offset torque is varied into 0.

15. The method for controlling a torque of an electric vehicle of claim 9, further comprising:
- storing, by the controller, the set offset torque when the electric vehicle is turned off and applying the stored offset torque to the basic creep torque line when the electric vehicle is started again.

16. A non-transitory computer readable medium containing program instructions executed by a controller, the computer readable medium comprising:
- program instructions that apply an offset torque, which is a parameter predetermined by a driver, to a basic creep torque line to set an offset torque line varied from the basic creep torque line in a negative (−) torque direction, when the predetermined offset torque is zero;
- program instructions that calculate a driver creep torque depending on a speed of an electric vehicle based on the offset torque line when the predetermined offset torque is greater than zero;
- program instructions that calculate a driver demand torque based on the speed of the electric vehicle and a position of an accelerator pedal; and
- program instructions that sum the driver demand torque and the driver creep torque to determine a final torque of a motor.

17. The non-transitory computer readable medium of claim 16, further comprising:
- program instructions that calculate a basic creep torque depending on the speed of the electric vehicle based on the basic creep torque line when the offset torque is not input.

18. The non-transitory computer readable medium of claim 17, wherein the driver creep torque has a regenerative braking amount increased as compared with the basic creep torque in a same speed condition of the electric vehicle.

* * * * *